(12) United States Patent
Palanduz

(10) Patent No.: US 7,011,726 B1
(45) Date of Patent: Mar. 14, 2006

(54) METHOD OF FABRICATING THIN DIELECTRIC FILM AND THIN FILM CAPACITOR INCLUDING THE DIELECTRIC FILM

(75) Inventor: Cengiz A. Palanduz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/951,054

(22) Filed: Sep. 27, 2004

(51) Int. Cl.
*B32B 31/26* (2006.01)
*B05D 5/12* (2006.01)
*H01G 4/10* (2006.01)
*H01G 4/12* (2006.01)

(52) U.S. Cl. .............................. 156/89.18; 156/89.12; 156/89.14; 156/89.16; 264/615; 264/621; 427/79; 427/80

(58) Field of Classification Search ............. 156/89.12, 156/89.14, 89.16, 89.18; 264/621; 427/79, 427/80
See application file for complete search history.

(56) References Cited

U.S. PATENT DOCUMENTS

| | | | |
|---|---|---|---|
| 5,140,498 A * | 8/1992 | Radford et al. ........... | 361/321.5 |
| 5,189,269 A * | 2/1993 | Stahly ..................... | 200/83 P |
| 5,593,495 A * | 1/1997 | Masuda et al. ............ | 117/4 |
| 6,207,522 B1 * | 3/2001 | Hunt et al. ............... | 438/393 |
| 6,331,325 B1 * | 12/2001 | Kulwicki et al. .......... | 427/79 |
| 6,440,751 B1 * | 8/2002 | Hase ........................ | 438/3 |
| 6,623,865 B1 * | 9/2003 | Zou et al. ................. | 428/472 |
| 6,841,080 B1 * | 1/2005 | Kingon et al. ............. | 216/6 |
| 6,876,536 B1 * | 4/2005 | Sakashita et al. ......... | 361/311 |
| 2002/0195612 A1 * | 12/2002 | Farrell .................... | 257/103 |
| 2004/0126484 A1 * | 7/2004 | Croswell et al. ........... | 427/79 |
| 2004/0227278 A1 * | 11/2004 | Kijima et al. ............. | 264/615 |
| 2005/0011857 A1 * | 1/2005 | Borland et al. ............ | 216/13 |

FOREIGN PATENT DOCUMENTS

JP      8-330179      * 12/1996

* cited by examiner

*Primary Examiner*—Melvin Mayes
(74) *Attorney, Agent, or Firm*—Laleh Jalali

(57) ABSTRACT

A method of fabricating a thin dielectric film, a thin dielectric film formed according to the method, and a system including the thin dielectric film. The method includes: depositing a ceramic precursor material on a metal sheet, the ceramic precursor material including a mixture comprising ceramic particles and an organic carrier medium; heat treating the ceramic precursor material such that the organic carrier medium is substantially burnt off, and further such that a dielectric layer is formed including ceramic grains formed from the ceramic particles, and having grain sizes between about 100 nm and about 500 nm; depositing a CSD precursor material onto the dielectric layer; and heat treating the CSD precursor material such that organics in the CSD precursor material are substantially burnt off, and further such that a CSD medium is formed from the CSD precursor material including CSD grains substantially filling the voids between the ceramic grains.

16 Claims, 3 Drawing Sheets

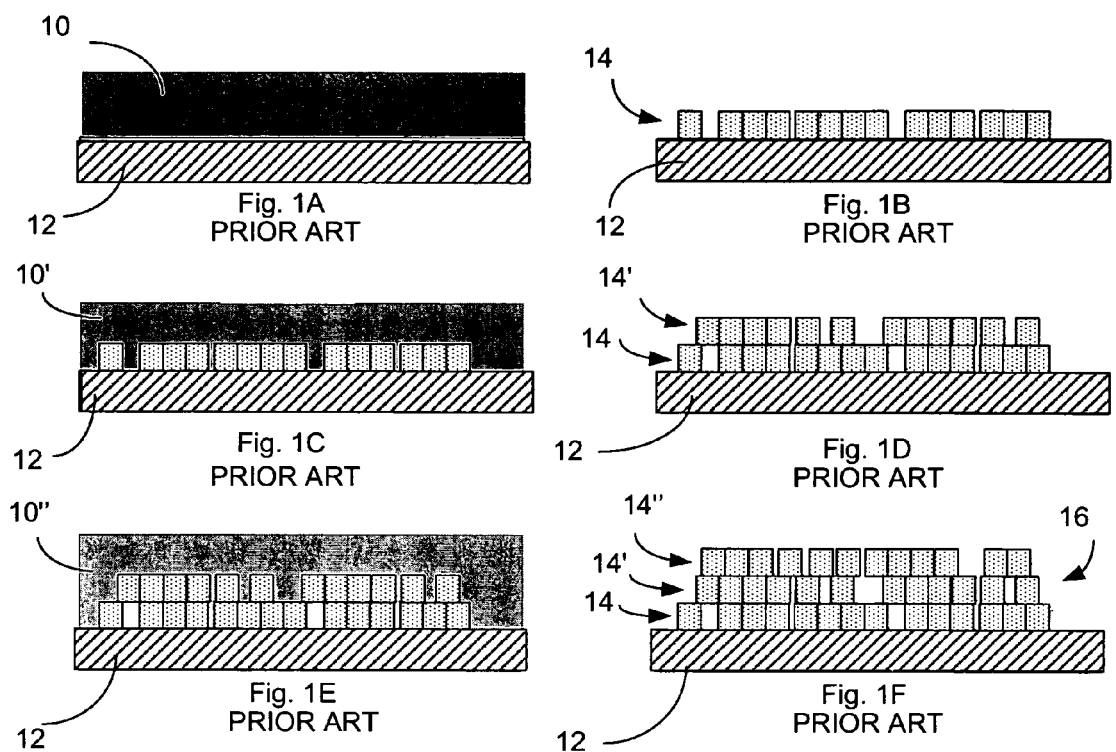

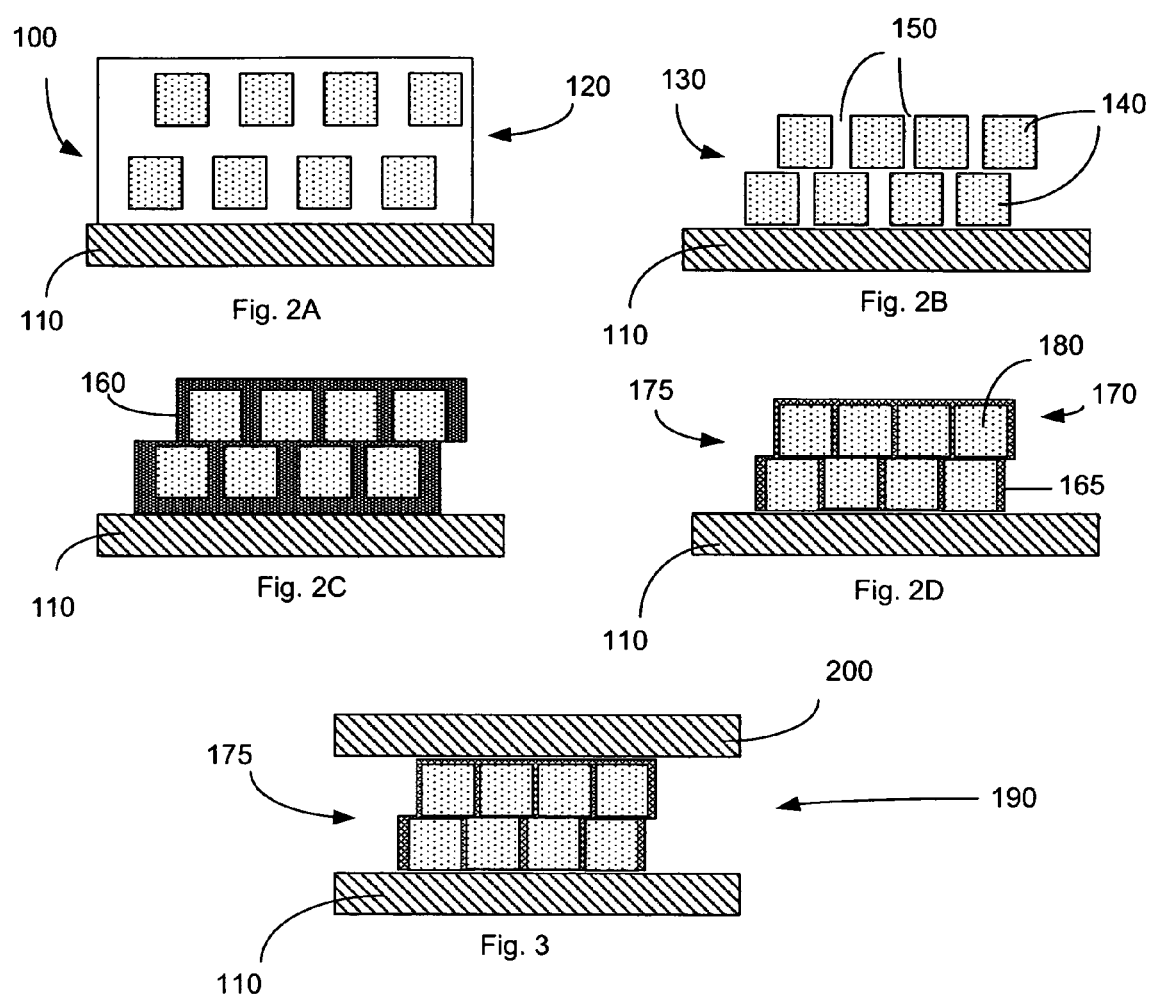

METHOD OF FABRICATING THIN DIELECTRIC FILM AND THIN FILM CAPACITOR INCLUDING THE DIELECTRIC FILM

FIELD

Embodiments of the present invention relate to thin film capacitors and to methods of fabricating same.

BACKGROUND

Creating thin films having a large capacitance density, that is, a capacitance density above about 1 $\mu F/cm^2$ on metal sheets presents a number of challenges. One way to achieve large capacitance density would be to achieve a large dielectric constant, given that capacitance density and dielectric constant are directly proportional to one another. It is well known that the dielectric constant of a material is among other things a function of the grain size of that material. In particular, as the grain size of a material increases, generally, so will its dielectric constant. However, growing thin films having large grain sizes, that is, thin films having grain sizes above about 50 nm to about 100 nm is a challenge. For example, growing a large grain microstructure requires an optimum combination of nucleation and grain growth. This is hard to achieve on a polycrystalline metal sheet. Typically, the multitude of random sites on the rough polycrystalline metal sheet acts as nucleation sites, resulting in a microstructure with very small grain size (about 10 nm to about 50 nm). Once the film microstructure is composed of a large number of small grains, further heating will not result in a large grain microstructure, because larger grains would grow at the expense of the smaller grains. However, a large number of similar-sized grains cannot grow into each other to form larger grains.

As a result of the above, attempts at creating thin films having a large capacitance density has shifted toward reducing a thickness of the deposited thin film dielectric, while avoiding the problems noted above with respect to creating dielectrics of large grain size. Thus, the prior art typically focuses on small grain sized thin film technology (that is dielectric thin films having grain sizes in the range from about 10 nm to about 50 nm, with dielectric constants ranging from about 100 to about 450. To the extent that the capacitance density of a material is known to be inversely proportional to its thickness, the prior art has aimed at keeping the thickness of such dielectric films in the order of about 0.1 microns. However, disadvantageously, such films have tended to present serious shorting issues. First, a surface roughness of the metal sheet onto which the dielectric film has been deposited, to the extent that it is usually significant with respect to a thickness of the dielectric film, tends to present metal peak and valleys into the dielectric film which in turn can lead to a direct shorting between the electrodes of a capacitor that includes the dielectric film. In addition, again, since a thickness of the dielectric film is small, voids typically present in the film will allow metal from at least one of the capacitor electrodes to seep into the voids, leading to shorting and leakage between the electrodes.

Voids in dielectric layers are disadvantageous for a number of other reasons. First, because of the presence of air pockets brought about as a result of the presence of voids, stress concentration points are typically created in the dielectric film, thus increasing the risk of crack propagation therein. In addition, to the extent that the dielectric constant of air is very small, the presence of air pockets results in an overall decrease in the dielectric constant of the dielectric layer. Thus, voids present disadvantages with respect to both the mechanical integrity and the electrical performance of a dielectric layer. The prior art proposes solving the problem of voids by exposing the dielectric layer to relatively long periods of sintering in order to densify the layer. However, such a solution disadvantageously increases the thermal budget required for the fabrication of a dielectric film, increasing cost while not necessarily guaranteeing a satisfactory reduction in the number of voids.

With respect to fabricating thin film capacitors, as noted above, a predominant prior art method involves chemical solution deposition (CSD). Referring to FIGS. 1A–1F, various stages of a prior art CSD method for creating a dielectric thin film are depicted. As seen in FIG. 1A, the shown CSD method involves the deposition of a CSD precursor film 10 onto a metal sheet or electrode 12. Deposition of the precursor may be achieved using well known spin-on deposition, spraying and dipping techniques. Thereafter, at FIG. 1B, the deposited precursor film 10 is shown as having been subjected to drying, burn-out of organics and annealing through heat treatment. As seen in FIG. 1B, heat treatment results in the decomposition of residual organics in the precursor and further in the growth of small-sized grains, which together contribute to form a first layer 14 of dielectric material. In FIGS. 1C and 1D, and in FIGS. 1E and 1F, fabrication stages similar to those in FIGS. 1A and 1B are respectively depicted. Thus, the deposition of a precursor film 10' and 10" as seen in FIGS. 1C and 1E is followed by heat treatment as seen in FIGS. 1D and 1F to yield second and third layers 14' and 14" of dielectric material, respectively. The resulting dielectric film 16 as shown in FIG. 1F disadvantageously contains grains of small size, in the order of about 10 nm to about 50 nm, thus exhibiting a low effective dielectric constant, typically in the range from about 100 to about 450. In addition, voids present in the dielectric film 16 tend to create shorts between the two electrodes of a capacitor formed from assembly 18 of FIG. 1F, as explained above.

Conventional thin film dielectric fabrication methods thus do not allow the formation of a dielectric film that both exhibits a high capacitance density and substantially avoids shorting and/or leakage issues between electrodes in a capacitor including the film.

BRIEF DESCRIPTION OF THE DRAWINGS

Embodiments of the present invention are illustrated by way of example and not by way of limitation in the figures of the accompanying drawings, in which the like references indicate similar elements and in which:

FIGS. 1A–1F illustrate stages in the fabrication of a dielectric film on a metal sheet according to the prior art;

FIGS. 2A–2D illustrate stages in the fabrication of a dielectric film on a metal sheet according to an embodiment of the present invention;

FIG. 3 illustrates a thin film capacitor fabricated according to an embodiment of the present invention.

DETAILED DESCRIPTION

Figure 4:
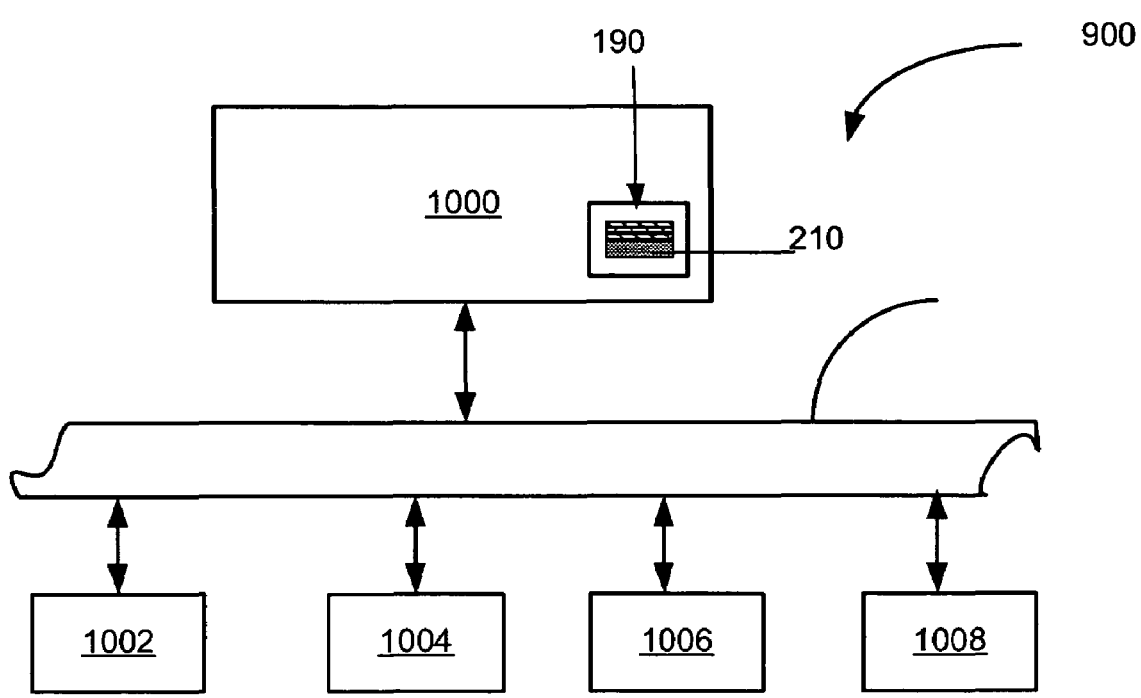
FIG. 4 illustrates a system comprising a thin film capacitor fabricated according to embodiments of the present invention.

Embodiments of the present invention pertain to methods of creating a high dielectric constant thin film on a metal sheet, to a thin film capacitor fabricated from a combination of the thin film, the metal sheet, and to a system including the thin film capacitor.

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The word "embodiment" is used repeatedly. The word generally does not refer to the same embodiment, however, it may. The terms "comprising", "having" and "including" are synonymous, unless the context dictates otherwise.

The phrases "thin film" and "dielectric film" are used interchangeably in the instant description, and refer to a dielectric film adapted to be used in a thin film capacitor. In addition, "metal sheet" as used herein refers to a sheet of metal adapted to be used as an electrode in a thin film capacitor.

Referring now to FIGS. 2A–2D, stages in the fabrication of a combination including a dielectric film on a metal sheet according to an embodiment of the present invention are shown.

As seen in FIG. 2A, a method according to an embodiment of the present invention includes depositing a ceramic precursor material 100, such as, for example, a ceramic green sheet onto a metal sheet 110 to obtain a first combination 120. The metal sheet 110 may include, by way of example, Cu or Ni. The ceramic precursor material 100 may include a mixture comprising ceramic powder and an organic binder, a plasticizer, or an organic solvent. According to embodiments of the present invention, the ceramic powder may have a ceramic particle size between about 0.05 micron to about 0.5 micron. Ceramic green sheets are typically used in the multilayer ceramic capacitor art, where multiple layers of green sheets are stacked in between successive multiple layers of metal paste, then fired, singulated, termination metallization added, and surface mounted onto circuit boards, and are thus available on the market for that reason. Examples of ceramic green sheets encompassed by embodiments of the present invention may include ceramic green sheets available from ceramic capacitor manufacturers, such as Murata and TDK, which would eventually be used in processing capacitors with temperature ratings, such as, Z5U, X6S, X7R, X7S, etc. Ceramic green sheets according to embodiments of the present invention may be deposited onto the metal sheet by way of roller pressing, by way of a carrier tape adhesive provided on one side of the green sheets, or, in the alternative, they may be laminated onto the metal sheet by a press.

Referring next to FIG. 2B, a method according to an embodiment of the present invention further includes heat treating the ceramic precursor material 100 after its deposition onto metal sheet 110 such that organics in the material are substantially burnt off, and further such that ceramic is sintered (densified) from the ceramic precursor material is densified, such as via sintering. During the sintering process, the driving force behind the densification of the ceramic is the tendency of the system to reduce its surface area, hence, its surface energy, by joining of the particles and elimination of voids in between. Process conditions for the heat treatment of ceramic precursor material 100 may, according to embodiments of the invention, comprise drying, burn-out of organics and annealing through heat treatment. During drying, the precursor material 100 may be exposed to temperatures between about 200 degrees Centigrade and about 300 degrees Centigrade for about 2 hours to about 5 hours to yield a dried deposit. During the subsequent burn-out stage, the dried deposit may be exposed to temperatures between about 400 degrees Centigrade and about 600 degrees Centigrade for about 3 hours to about 7 hours to yield an intermediate deposit. During annealing stage, the intermediate deposit may be exposed to temperatures between about 1000 degrees Centigrade and about 1400 degrees Centigrade for about 6 hours to about 24 hours. In order to avoid oxidizing the metal sheet 110 during heat treatment of the ceramic precursor material 100, such as, for example, when the metal sheet 110 is made of Cu or Ni, heat treatment may be performed in a reducing atmosphere. Heat treatment of ceramic precursor material 100 as shown in the embodiment of FIG. 2B results in the formation of a heat treated ceramic layer 130 above metal sheet 110, layer 130 including grains 140 having sizes between about 100 nm and about 500 nm in order to form a ceramic film with a thickness less than or equal to 1 micron. Typically, a ceramic green sheet tends to shrink by about 20% along its linear dimensions as a result of sintering. The above would suggest that the centers of adjacent ceramic grains would be closer to each other by 20% after heat treatment, as result of the atoms diffusing away from the inter-center bulk regions to voids, resulting in densification and shrinkage. Preferably, according to one embodiment, layer 130 may have a thickness between about 0.3 micron and about 1 micron, and preferably a thickness of about 0.5 micron. As seen in FIG. 2B, layer 130 may define voids 150 (or pinholes) between at least some of the grains 140. As noted above, voids in the dielectric layer present a number of disadvantages, such as, for example, shorting between the electrodes of a capacitor made from the dielectric layer, leakage within the capacitor, a reduction in the dielectric constant of the dielectric layer, and an increased risk of crack propagation within the dielectric layer. As will be explained further below with respect to FIGS. 2C and 2D, embodiments of the present invention pertain to a method of substantially eliminating voids in the dielectric layer, such as dielectric layer 130 shown in FIG. 2B, advantageously improving the electrical performance and mechanical integrity of a dielectric film made from the dielectric layer.

Referring next to FIG. 2C, a method according to an embodiment of the present invention further includes filling voids 150 present in layer 130 with a CSD precursor material 160. As seen in FIG. 2C, the shown CSD method thus involves the deposition of CSD precursor material 160 onto dielectric layer 130. The CSD precursor material 160 may include an organic liquid solution of organic molecules with embedded metal atoms. The precursor material 160 may, by way of example, include either: (1) barium and strontium acetates, dissolved in acetic acid, mixed with titanium tetra-isopropoxide in isopropanol; (2) barium and strontium acetate dissolved in acetic acid mixed with titanium tetra n-butoxide stabilized with acetylacetone and diluted with 2-methoxyethanol; 3) barium and strontium propionates and titanium tetra n-butoxide stabilized with acetylacetone dissolved in a mixture of propionic acid and 1-butanol. Deposition of the CSD precursor material may be achieved using well known spin-on, spray or dipping techniques. The CSD precursor material thus deposited will substantially fill voids 150 by flowing through cracks in dielectric layer 130.

Thereafter, at FIG. 2D, the deposited CSD precursor material 160 may be subjected to heat treatment including drying, organic burn-out and annealing. During drying, the precursor film 10 may be exposed to temperatures between about 100 degrees Centigrade and about 200 degrees Centigrade for about 15 minutes to about 30 minutes to yield a dried CSD deposit. During the subsequent burn-out stage, the dried deposit may be exposed to temperatures between about 300 degrees Centigrade to about 500 degrees Centigrade for about 1 hour and about 3 hours to yield an intermediate CSD deposit. During annealing, the intermediate deposit may be exposed to temperatures between about 500 degrees Centigrade to about 1000 degrees Centigrade, preferably for about 0.5 hour and about 3 hours, although longer exposure times would be possible. Heat treatment results in the burning out of residual organics in the precursor 160 and further in the growth of small-sized CSD grains 165 in CSD medium 170. Grains 165 could, by way of example, include barium strontium titanate. Heat treatment will allow better densification of the CSD grains. Grains 165 of medium 170 contribute to substantially fill voids between grains 180. The resulting dielectric film 175 as shown in FIG. 2D advantageously contains grains 180 of large size, in the order of about 100 nm and about 500 nm. In addition, as a result of the CSD deposition described above, voids between grains 180 are substantially filled by the resulting CSD grains 165 which have a smaller size, that is, a size in the range from about 0.02 to about 0.04 microns. The resulting dielectric film 175 thus has large capacitance density, for example, between about 500 to about 4000 with minimal voids.

An alternate embodiment of the present invention would involve the deposition of the CSD precursor material 160 directly onto the ceramic precursor material 100 before heat treatment of the ceramic precursor material. Heat treatment of both CSD precursor material and of the ceramic precursor material would then take place simultaneously, yielding the structure shown in FIG. 2D.

Referring next to FIG. 3, a thin film capacitor 190 according to an embodiment of the present invention is shown as having been formed from the combination of FIG. 2D. As seen in FIG. 3, a second metal sheet 200 is provided above dielectric film 175 by any of well known techniques, such as, for example, sputtering copper followed by copper plating, or copper vacuum evaporation, etc. Thin film capacitor 190 may be embedded into an organic substrate according to any of the well known methods, as would be readily recognized by one skilled in the art.

Advantageously, embodiments of the present invention yield thicker and hence more mechanically and electrically reliable dielectric films for thin film capacitors. Dielectric films according to embodiments of the present invention have higher dielectric constants (typically in the range between 700 and 4000) than dielectric films of the prior art (typically in the range between 100 and 450). The higher dielectric constants are a result of the dominant presence of large grain high k material, in this way potentially yielding large capacitance densities, despite a greater thickness of the dielectric films. The greater thickness of the dielectric films according to embodiments of the present invention further contributes to a minimization in shorting and/or leakage issues of the prior art. In addition, embodiments of the present invention advantageously avoid the need to grow large grains starting from CSD precursor materials, and the problems associated therewith, since large grains would already be present in the ceramic precursor material for the dielectric film. Moreover, embodiments of the present invention would advantageously reduce manufacturing costs for thin films to the extent that they make possible the use of high volume manufacturing powder green sheets as opposed to the use of CSD precursor chemicals.

Referring to FIG. 4, there is illustrated one of many possible systems in which embodiments of the present invention may be used. There is shown a system 900 including an electronic assembly 1000 which may include a thin film capacitor 190 similar to thin film capacitor 190 of FIG. 3, capacitor 190 having been embedded onto an organic substrate and packaged along with a die 210. Electronic assembly 1000 may also include a microprocessor, or an application specific IC (ASIC). Integrated circuits found in chipsets (e.g., graphics, sound, and control chipsets) may also be packaged in assembly 1000 accordance with embodiments of this invention.

For the embodiment depicted by FIG. 4, the system 900 may also include a main memory 1002, a graphics processor 1004, a mass storage device 1006, and/or an input/output module 1008 coupled to each other by way of a bus 1010, as shown. Examples of the memory 1002 include but are not limited to static random access memory (SRAM) and dynamic random access memory (DRAM). Examples of the mass storage device 106 include but are not limited to a hard disk drive, a compact disk drive (CD), a digital versatile disk drive (DVD), and so forth. Examples of the input/output module 1008 include but are not limited to a keyboard, cursor control arrangements, a display, a network interface, and so forth. Examples of the bus 1010 include but are not limited to a peripheral control interface (PCI) bus, and Industry Standard Architecture (ISA) bus, and so forth. In various embodiments, the system 900 may be a wireless mobile phone, a personal digital assistant, a pocket PC, a tablet PC, a notebook PC, a desktop computer, a set-top box, a media-center PC, a DVD player, and a server.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method of fabricating a thin dielectric film comprising:
    depositing a ceramic precursor material on a metal sheet, the ceramic precursor material including a mixture comprising ceramic particles and an organic carrier medium;
    heat treating the ceramic precursor material such that the organic carrier medium is substantially burnt off, and further such that a dielectric layer is formed including ceramic grains formed from the ceramic particles, and having grain sizes between about 100 nm and about 500 nm;

depositing a CSD precursor material onto one of the ceramic precursor material and the dielectric layer;

heat treating the CSD precursor material after depositing the CSD precursor material such that organics in the CSD precursor material are substantially burnt off, and further such that a CSD medium is formed from the CSD precursor material including CSD grains substantially filling the voids between the ceramic grains.

2. The method of claim 1, wherein the CSD grains have grain sizes between about 0.02 and about 0.04 microns.

3. The method of claim 1, wherein the ceramic particles have particle sizes between about 0.05 micron and about 0.50 micron.

4. The method of claim 1, wherein the ceramic precursor material includes a ceramic green sheet.

5. The method of claim 4, wherein the ceramic green sheet includes one of Z5U, X6S, X7R, and X7S.

6. The method of claim 4, wherein depositing the ceramic precursor material includes one of roller pressing the ceramic green sheet onto the metal sheet, and adhering the green sheet onto the metal sheet via an adhesive provided on one side of the green sheet, and laminating the green sheet onto the metal sheet.

7. The method of claim 1, wherein heat treating the ceramic precursor material comprises:
drying the ceramic precursor material to yield a dried deposit;
burning-out the organic carrier medium from the organic carrier medium from the dried deposit to yield an intermediate deposit; and
annealing the intermediate deposit.

8. The method of claim 7, wherein:
drying the ceramic precursor material comprises exposing the ceramic precursor material to temperatures between about 200 degrees Centigrade and about 300 degrees Centigrade for about 2 hours to about 5 hours to yield the dried deposit;
burning out the organic carrier medium comprises exposing the dried deposit to temperatures between about 400 degrees Centigrade and about 600 degrees Centigrade for about 3 hours to about 7 hours to yield the intermediate deposit; and
annealing comprises exposing the intermediate deposit to temperatures between about 1000 degrees Centigrade and about 1400 degrees Centigrade for about 6 hours to about 24 hours.

9. The method of claim 1, wherein heat treating the ceramic precursor material comprises heat treating in a reducing atmosphere.

10. The method of claim 1, wherein the CSD precursor material comprises an organic liquid solution of organic molecules with embedded metal atoms.

11. The method of claim 10, wherein the CSD precursor material comprises one of:
barium and strontium acetates, dissolved in acetic acid, mixed with titanium tetra-isopropoxide in isopropanol;
barium and strontium acetate dissolved in acetic acid mixed with titanium tetra n-butoxide stabilized with acetylacetone and diluted with 2-methoxyethanol; and
barium and strontium propionates and titanium tetra n-butoxide stabilized with acetylacetone dissolved in a mixture of propionic acid and 1-butanol.

12. The method of claim 1, wherein the CSD medium comprises barium strontium titanate.

13. The method of claim 1, wherein depositing the CSD precursor material comprises one of spinning the CSD precursor material onto the dielectric layer, spraying the CSD precursor material onto the dielectric layer, and dipping the dielectric layer into a CSD precursor material bath.

14. The method of claim 1, wherein heat treating the CSD precursor material comprises:
drying the CSD precursor material to yield a dried CSD deposit;
burning out organics from the CSD precursor material to yield an intermediate CSD deposit; and
annealing the intermediate CSD deposit.

15. The method of claim 14, wherein:
drying the CSD precursor material comprises exposing the CSD precursor material to temperatures between about 100 degrees Centigrade and about 200 degrees Centigrade for about 15 minutes to about 30 minutes to yield the dried CSD deposit;
burning out organics comprises exposing the dried CSD deposit to temperatures between about 300 degrees Centigrade and about 500 degrees Centigrade for about 1 hour to about 3 hours to yield the intermediate CSD deposit; and
annealing comprises exposing the intermediate CSD deposit to temperatures between about 500 degrees Centigrade and about 1000 degrees Centigrade for about 0.5 hour and about 3 hours.

16. The method of claim 1, wherein the metal sheet comprises one of Cu and Ni.

* * * * *